Feb. 5, 1952     O. G. BROWN     2,584,256
ROLLER TYPE RATCHET STRUCTURE
Filed April 6, 1949     2 SHEETS—SHEET 1

Inventor
OREN G. BROWN
By WHITEHEAD & VOGL
PER Earle Whitehead
Attorneys

Feb. 5, 1952 — O. G. BROWN — 2,584,256
ROLLER TYPE RATCHET STRUCTURE
Filed April 6, 1949

Inventor
OREN G. BROWN
By WHITEHEAD & VOGL
PER Earle Whitehead
Attorneys

Patented Feb. 5, 1952

2,584,256

UNITED STATES PATENT OFFICE 2,584,256

ROLLER TYPE RATCHET STRUCTURE

Oren G. Brown, Seattle, Wash.

Application April 6, 1949, Serial No. 85,899

2 Claims. (Cl. 192—44)

This invention relates to means for the connection and disconnection of concentrically rotatable driving and driven members whereby the rotation of the driven member is restricted to a given direction in the manner of a conventional ratchet means, and the invention herein will be referred to as a ratchet. As such, my invention may be used in wrenches, shaft couplings, hand brakes and other devices which require movement of the driven member in a restricted direction as by the use of a ratchet. However, the ratchet herein described is of a type wherein the driving member and the driven member are interlocked frictionally by intermediate guided rollers.

An object of this invention is to provide in a ratchet, of the type described, improved means for setting the driving and driven members for interlocked movement in either direction, which means also provide a neutral or unlocked position of the driving and driven members.

Another object of this invention is to provide in a ratchet, of the type described, improved means for instantly locking the driving and driven members at any position of the driving member with relation to the driven member whenever the driving and driven members are set for movement in either direction, and, in such improved ratchet, means for reversing the direction of rotation.

Another object of this invention is to provide, in such a ratchet, improved means for instantly, and with minimum torque, unlocking driving and driven members upon reversal of movement.

With the foregoing and other objects in view, all of which shall more fully hereinafter appear, the invention comprises certain novel constructions, arrangements and combinations of parts as shall now be described and as defined in the appended claims and illustrated, in preferred embodiment, in the accompanying drawing, in which:

Figure 1:
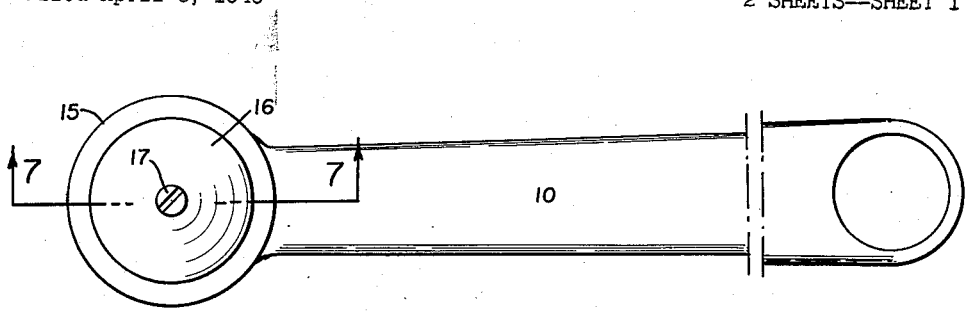
Figure 1 is a plan view of the invention as embodied in a conventional socket wrench handle.
Figure 2:
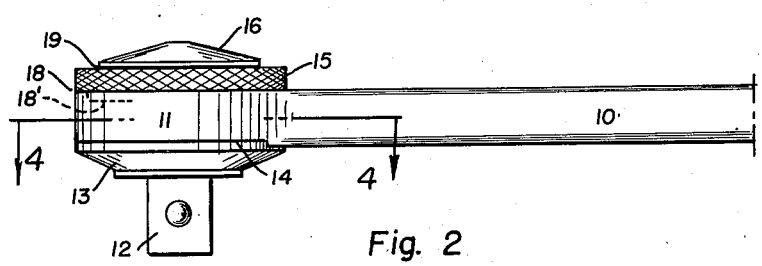
Figure 2 is a side elevation of the wrench handle illustrated at Fig. 1.
Figure 3:
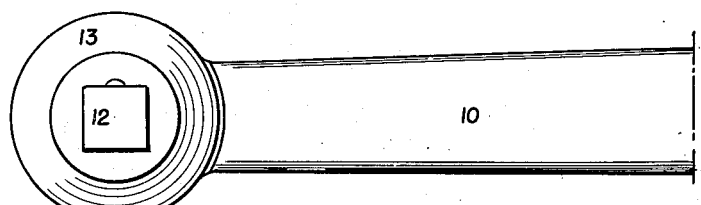
Figure 3 is a bottom view of the wrench handle illustrated at Fig. 1.

The invention is here illustrated as embodied in a socket wrench and described in terms appropriate thereto, but it will have many other uses as will be obvious to those skilled in the art. The socket wrench handle 10, illustrated in Figs. 1, 2 and 3, has a cylindrical head 11 constituting, in this embodiment, the driving member thereof, and a socket attachment 12 mounted upon a flange 13 conveniently of the same diameter as the head 11 constituting, herein, the driven member. The flat underside of the head 11 rests upon flange 13 to form a plane of contact at 14, thereby permitting constant axial relation between the head 11 and flange 13 at all rotative positions of the flange with respect to the head. In this ratchet there is also provided a shifting spool 15 conveniently of the same diameter as the head 11 and preferably knurled on the periphery for easy gripping, and a cap 16 thereabove, both the spool 15 and the cap 16 rotatable with the flange 13 and attached thereto by a flathead screw 17. The underside of the shifting spool 15 rests upon the flat upperside of the head 11 to form planes of contact at 18 and 18', thereby permitting constant axial relation between the head 11 and the shifting spool 15 at all rotative positions of the spool with respect to the head. Likewise, there is a similar plane of contact at 19 between the shifting spool 15 and the cap 16.

Figures 4, 5:
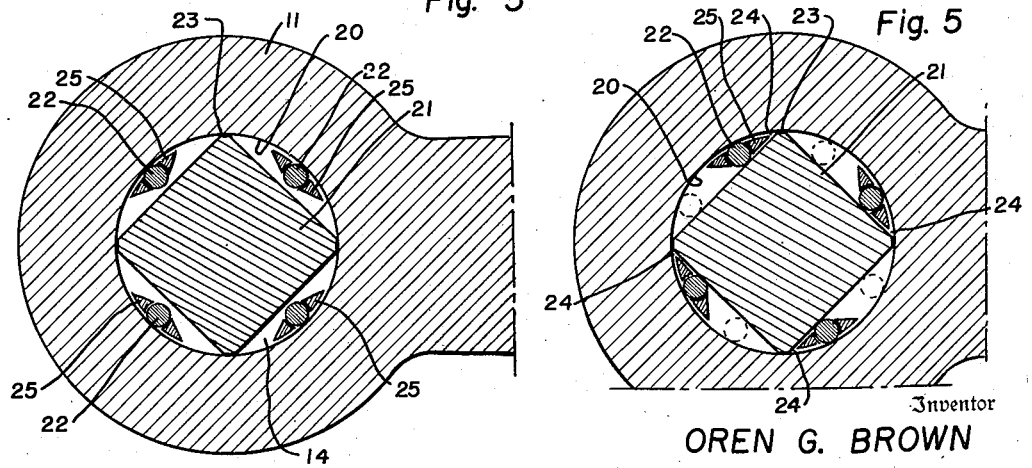
Figure 4 is a sectional view, on an enlarged scale, as viewed from line 4—4 in Fig. 2.
Figure 5 is similar to Fig. 4 but shows the driving and driven members in interlocked position.
Figure 6:
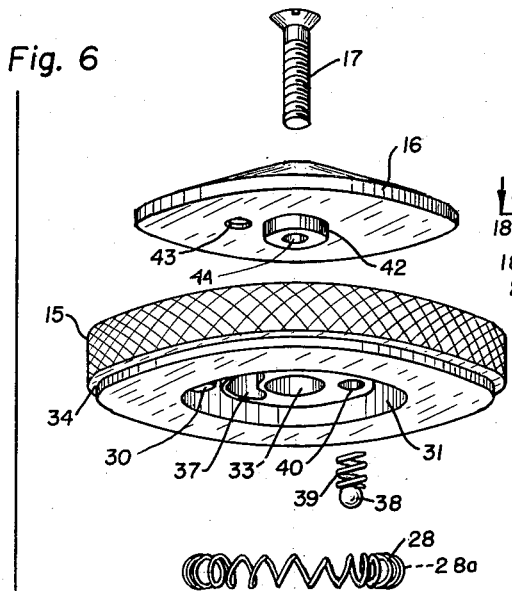
Figure 6 is an exploded view of the elements constituting the ratchet.
Figure 7:
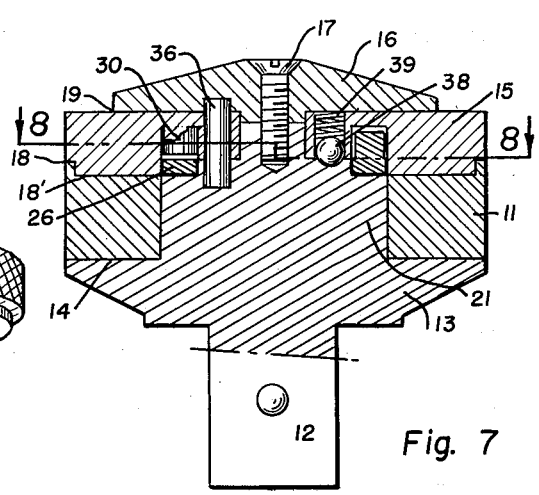
Figure 7 is a sectional view, on an enlarged scale, taken on line 7—7 in Fig. 1.

The head 11 is provided with an orifice 20 wherein projects a boss 21 attached to and extending above the flange 13. While this boss is illustrated as square in cross section, it is within the contemplation of this invention to have the cross section of the boss in any regular shape, which will afford the required relationship, later described, between the side faces of the boss and the wall of the orifice 20, it being understood that the rollers and journals, later described, will correspond to the number of side faces on the boss. The cylindrical wall of the orifice 20 and the side faces of the boss 21 constitute the contacting surfaces of the driving and driven members which are interlocked by rollers 22 as illustrated in Fig. 5. It follows that the orifice 20 must be truly circular and carefully finished in accordance with good machine shop practice, and preferably of hardened metal to withstand high contact stresses encountered by engagement with the rollers 22; likewise, the boss 21 must be made true, carefully finished and of hardened material, and the rollers 22 truly cylindrical, hardened and all of the same diameter; all of this being necessary to insure efficient and uniform contact by all rollers against the surfaces of the orifice and boss. It may be desirable to provide small arcuate flats 23 at the corners of the square boss 21 with the necessary operational clearance between these flats and the wall of the orifice 20 to permit adjustments and alignment of the individual rollers as driving rotation of the ratchet begins.

During operation of the wrench the rollers 22 move with the boss 21 and their position with respect to the boss determines the direction of the driving rotation, this being clockwise in the illustration at Fig. 5, and would become counter-clockwise were the rollers shifted to the positions indicated by the dotted circles at Fig. 5. Moreover, a neutral position may be desirable as indicated at Fig. 4, where there is no engagement of the rollers 22 with the boss 21 and, therefore, no operational contact between the driving member and driven member. In the illustration at Fig. 5, engagement of the rollers 22 occurs with clockwise rotation of the driving member whenever the driven member resists such rotation, for any clockwise movement of the head 11 relative to the boss 21 will cause the rollers 22 to rotate clockwise into the wedge-shaped openings 24 formed between the surfaces of the orifice 20 and the square boss 21, and the rollers will then bear tightly against both surfaces, making further movement between the head 11 and the boss 21 impossible unless slippage of the rollers were to occur. However, any slippage is prevented by the selection of rollers of sufficient diameter, such that, in their wedged position, the angle between the surfaces of the orifice 20 and square boss 21 is less than a critical wedge angle which may be easily determined by those skilled in the art by ascertaining the co-efficient of static friction between the materials forming the head, rollers and boss. Release of the rollers by moving the driving member in a counter-clockwise direction will, with the rollers in the position indicated at Fig. 5, cause the rollers to also rotate counter-clockwise out of the wedge-shaped openings 24 to cause disengagement of the driving and driven members whereby a return movement of the driving member is possible as with a conventional ratchet. This disengagement action requires little force, in fact it is virtually automatic because of the inherent elasticity of the materials forming head, rollers and boss, the release of stresses upon the termination of clockwise movement tending to spring the rollers out of the wedge-shaped openings 24.

The rollers 22 are mounted in journal-boxes 25 carried by a ring 26 and depending therefrom to form a cage, rotatable about the common axis of the head 11 and boss 21, to position the cylindrical rollers in parallel relation with the said common axis to ensure line contact of the elements of the rollers with the surfaces of the orifices 20 and the boss 21, and to positively shift the rollers to clockwise, counter-clockwise driving position or to the neutral position, the ring 26 being mounted upon boss 21 and aligned therewith by a cylindrical positioning plate 27 on the boss 21, the inner circular opening of the ring 26 slidably and rotatably fitting the plate 27. Movement of the ring 26 is effected by circular springs 28 and 28a which engage lug 29 extending above the ring 26 and attached thereto where, through this spring action, the rollers may be resiliently held in a firm but yielding contact against the surfaces of the orifice 20 and boss 21 when in operative position, thereby eliminating all slippage and holding to a minimum the initial movement between the driving and driven members required to interlock the rollers.

Figure 9:
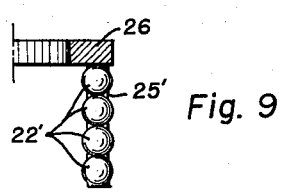
Figure 9 is a fragmentary view of the ring-mounted journal but illustrating the use of balls, instead of rollers, as the interlocking elements.
Figure 8:
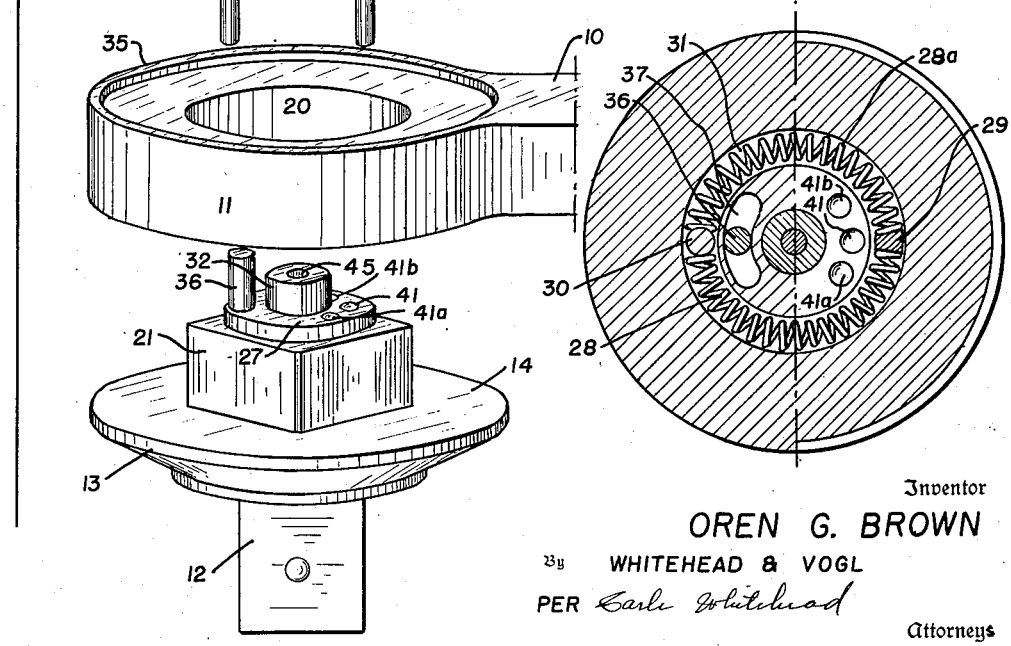
Figure 8 is a sectional view taken on line 8—8 in Fig. 7.

If it should appear desirable, the rollers may be replaced by a sphere or plurality of spheres 22' as illustrated in Fig. 9, without altering the other elements or changing the function of operation, the spheres being aligned in cages 25' carried by the ring 26 in the manner described above.

Springs 28 and 28a lie in groove 31 in shifting spool 15 resiliently connecting lug 29 with lug 30 normally opposite thereto.

Movement of the cages 25 is effected by rotation of spool 15 which moves its carried lug 30 to one side or the other, thus compressing one of the springs 28 or 28a against lug 29 and causing lug 29 and its carrier ring 26 and cages 25 to rotate.

The shifting spool 15 is mounted upon the flat surface of positioning plate 27 on boss 21, centered orifice 33, of the shifting spool 15, encircling ring 32 on boss 21. The shifting spool is also conveniently provided with concentric offset 34 on its underside whereby it may be conveniently seated within annular rim 35 on the upperside of the head 11, thereby holding the head also to the common axis. A pin 36, normal to the flat surface of the positioning plate 27 and carried thereby, passes through arcuate slot 37 in the shifting spool 15, thereby limiting the movement of the spool with respect to movement of the boss 21, the said movement limited to the extent of the arcuate slot, conveniently proportioned to position the rollers 22 for clockwise or counter-clockwise driving rotation. The spool 15 is resiliently held in position with respect to the boss 21 through a spring loaded sphere 38, the sphere 38 and spring 39 being mounted in orifice 40 in the spool 15, and the lower segment of the sphere fitting into indentations 41 or 41a or 41b on the flat surface of the positioning plate 27. When at 41, the rollers are disengaged and the ratchet is neutral; when at 41a, the rollers are engaged for clockwise driving rotation, and when at 41b the rollers are engaged for counter-clockwise rotation.

This assembly is held in position by cap 16, thereabove, provided with concentric ring 42 which fits into centered orifice 33 of the shifting spool to connect with the ring 32 of the boss 21. An orifice 43 is also provided in this cap aligned with pin 36 which extends through the arcuate slot 37 of the shifting spool 15 and into the orifice 43 thereby locking the cap 16 in fixed relation with the boss 21. The flat-head screw 17 passes through centered orifice 44 in the cap 16 and is threaded in orifice 45 in the ring 32 to hold the assembly together.

The simplicity and desirable characteristics of this invention may be illustrated through describing a typical operation as turning a nut onto a stud. A conventional socket is placed on the attachment 12, and over the nut. Usually, the nut will turn loosely onto the stud for a short distance which is best done by turning the shifting spool 15 with finger motion while holding the ratchet in a fixed position. As the nut tightens on the stud, the shifting spool 15 will move with respect to the stud 21, and if the motion is in a clockwise direction the sphere 38 will drop into indentation 41a, thereby resiliently shifting the rollers 22 to a position for clockwise driving torque, which may be applied by ratchet handle 10 as soon as the nut is so tight that it is no longer possible to rotate the shifting spool with the fingers. If at any time it becomes desirable to reverse this motion, the shifting spool may be turned in the desired direction, and if the nut is sufficiently loose, it may be completely unthreaded by turning only the shifting spool, but if not, the shifting spool will move the sphere 38 into the indentation 41b whereupon the wrench handle may be used only to loosen the nut to a point where the shifting spool may again be turned by the fingers. It is apparent that such action materially speeds and facilitates such operations as require ratchet type movements, and that the natural directional adjustments permit ease in using the tool.

I have illustrated and herein described many details of construction but other equivalent and alternative arrangements and structures, functioning similarly in principle, will occur to those skilled in the art and within the scope and spirit of the foregoing description and of the appended claims, and I am to have my protection limited in scope only by the appended claims.

I claim:

1. A ratchet tool comprising in combination, a driving member having a circular orifice therein, a driven member having a prismatic boss rotatably positioned within said circular orifice, a circular member between each face of the boss and the wall of the orifice, a rotatable ring carrying cages holding said circular members in fixed parallel interrelation, a shifting spool rotatably carried on the end of said boss and having outward means adapted for manual gripping and rotation of the spool, interrelative opposed spring means connecting the shifting spool with said ring to resiliently impart rotation to said ring corresponding in direction of the rotation of the shifting spool and thereby wedge said circular members against the wall of the orifice and the faces of the boss, an arcuate slot in the spool, and a stud upstanding from the boss and a stub upstanding from the boss and extending into said slot whereby rotation of the spool with respect to the boss is limited by the length of the slot.

2. In the organization defined in claim 1, means for resiliently locking the shifting spool arcuate position with respect to the boss at the limits fixed by the length of the slot.

OREN G. BROWN.

REFERENCES CITED

The following references are of record in the file of this patent:

UNITED STATES PATENTS

| Number | Name | Date |
| --- | --- | --- |
| 1,163,803 | Bickford | Dec. 14, 1915 |
| 1,981,526 | Rueb | Nov. 30, 1934 |
| 2,153,988 | Padgett | Apr. 11, 1939 |
| 2,408,506 | Briskin et al. | Oct. 1, 1946 |